(No Model.) 2 Sheets—Sheet 2.
J. J. ANDERSON.
MACHINE FOR MAKING CAR COUPLING LINKS.
No. 350,859. Patented Oct. 12, 1886.
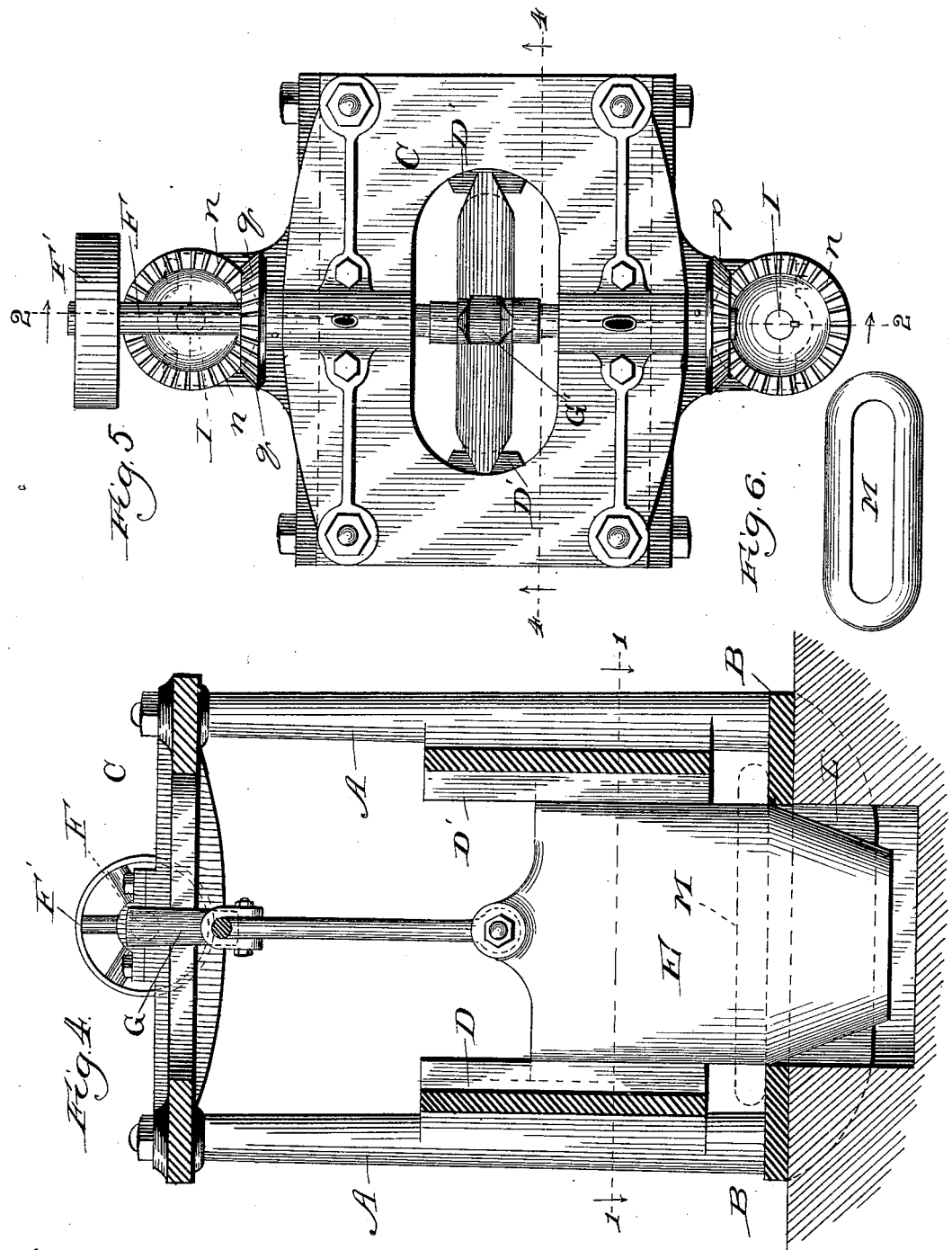

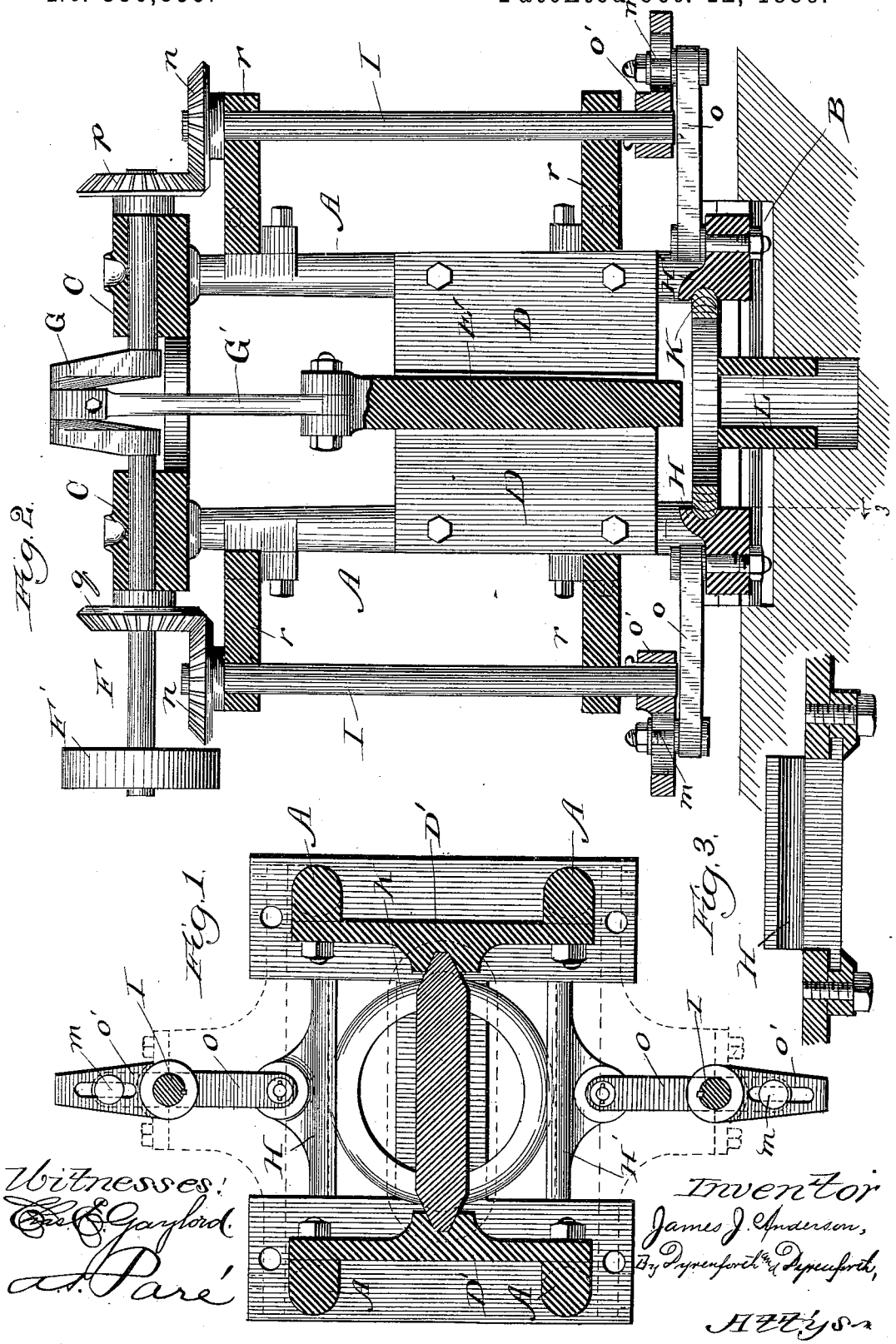

UNITED STATES PATENT OFFICE.

JAMES J. ANDERSON, OF CHICAGO, ILLINOIS, ASSIGNOR OF ONE-HALF TO ASA G. PETTIBONE AND A. H. MULLIKEN, BOTH OF SAME PLACE.

MACHINE FOR MAKING CAR-COUPLING LINKS.

SPECIFICATION forming part of Letters Patent No. 350,859, dated October 12, 1886.

Application filed February 9, 1886. Serial No. 191,300. (No model.)

*To all whom it may concern:*

Be it known that I, JAMES J. ANDERSON, a citizen of the United States, residing at Chicago, in the county of Cook and State of Illinois, have invented a certain new and useful Machine for Manufacturing Coupling-Links for Cars; and I hereby declare the following to be a full, clear, and exact description of the same.

My present invention relates particularly to a machine for shaping to the form of a car-coupling link coiled bar metal welded into a homogeneous annular body, for which coiling and welding operations the machinery forms the subjects of separate applications for Letters Patent filed concurrently herewith.

My invention consists in the general construction of my improved machine; and it also consists in certain details of construction and combinations of parts, all as hereinafter more fully set forth.

Referring to the drawings, Figure 1 is a sectional plan view of my improved machine, taken on the line 1 1 of Fig. 4; Fig. 2, a vertical sectional side elevation taken on the line 2 2 of Fig. 5; Fig. 3, a sectional view showing a detail of construction, and taken on the line 3 3 of Fig. 2; Fig. 4, a sectional side elevation of the machine, taken on the line 4 4 of Fig. 5; Fig. 5, a plan view of the same, and Fig. 6 a similar view of a finished link.

A A are pillars, preferably four in number, one at each corner of a square, supported on the base B, and carrying on their upper extremities the table C, and the pillars A are provided with lateral extensions $r$, forming bearings for parts hereinafter described, and with guides D and D' for the mandrel E, also hereinafter described. The pillars, base, and table afford the frame of the machine.

F is a rotary horizontal shaft supported to rotate in bearings provided in the top plate or table, C, having means, as shown, to permit lubrication, and provided at one extremity with a belt-wheel, F', and with an intermediate beveled gear-wheel, $q$, and a similar wheel, $p$, at its opposite extremity. Toward the center of the machine the shaft F is separated, as shown in Figs. 2 and 5, and connected by an eccentric or crank, G, carrying a pitman, G', to the lower end of which the mandrel E is connected. This mandrel is flat on its opposite sides, being of a thickness above its lower tapering extremity corresponding with the inner cross-diameter of a link when formed, and of a width in the same part corresponding with the inner longitudinal diameter of a finished link, and tapering toward its lower extremity to an extent of cross-section which will allow it to enter the ring to be stretched into the link form, and it is guided in its reciprocating movement (when it extends below the surface of the bed-plate B, which is provided with an opening to permit the passage through it, and the crank and pitman extend through an opening in the top plate, provided for the same purpose) by the guides D and D'.

H and H' are laterally-operating compressor-dies grooved longitudinally on their inner surfaces, as clearly shown in Fig. 2, and reciprocated by means of cranks $o\ o'$, keyed to the ends of vertical shafts I, passing through and stayed by the lateral extensions $r$, and carrying each at its upper extremity a beveled gear-wheel, $n$, in mesh with an adjacent gear-wheel, $q\ p$, and the part $o'$ of each crank $o\ o'$ is slotted to receive the connecting-bolt $m$, whereby it may be adjusted to increase or diminish the extent of throw of the dies H H', as required for links of different sizes.

The parts thus described are so arranged that when the shaft F is driven by proper connection thereof through the medium of a belt or equivalent mechanism passing over the wheel F' and connected with the driving-power, at the same time the crank G reaches its highest point, thereby raising the mandrel E to its highest point, the compressor-dies H H', actuated through the beveled-gear connection $q\ n$ and $p\ n$ of the shaft F with the cranks $o\ o'$, will be at their starting-points of compression; and thus when the crank G and mandrel E have reached their lowest points the compressor-dies H H' will have reached the limits of their compressing movements. When, therefore, an annular body, K, is placed in position at the base of the machine upon the top of a strengthening-web, L, extending upward sufficiently far to bring the ring K in line with the grooves in the compressor-dies H H', the downward motion of the mandrel E will, owing to the increase in its cross-section from the tapering extremity upward, as shown, cause it to enter the ring and extend it lengthwise, and the simultaneous inwardly-lateral movements of the compressor-dies H H' will assist in the extension of the annular body to form a link by the lateral pressure exerted, and thus a link, M, is produced from an annular metal body, K.

The machine may be readily caused to operate on its side, when, of course, the reciprocating motion of the mandrel E will be lateral instead of vertical.

What I claim as new, and desire to secure by Letters Patent, is—

1. In a machine for shaping annular metal bodies into coupling-links, the combination, with the frame of the machine and the driving-shaft F, of the flattened and tapered mandrel E, substantially as and for the purpose set forth.

2. In a machine for shaping annular metal bodies into coupling-links, the combination, with the frame of the machine, the driving-shaft, and the laterally-reciprocating compressor-dies, of the flattened and tapered mandrel E, substantially as and for the purpose set forth.

3. In a machine for shaping annular metal bodies into coupling-links, the combination, with the frame of the machine, the driving-shaft, and the laterally-reciprocating compressor-dies, grooved in their inner surfaces, of the flattened and tapered mandrel E and guides for the mandrel, substantially as and for the purpose set forth.

4. In a machine for shaping annular metal bodies into coupling-links, the combination, with the frame of the machine, of a strengthening-rib, L, for the base, affording a seat for the ring, a driving-shaft, F, a vertically-reciprocating mandrel, E, guides for the mandrel, and laterally-reciprocating compressor-dies H H', substantially as described.

5. In a machine for shaping annular metal bodies into coupling-links, the combination, with the frame of the machine, of a horizontal driving-shaft, F, beveled gear-wheels $q\,p$, and a crank, G, on the driving-shaft, a mandrel, E, reciprocated by the crank G, vertical shafts I, having at their upper extremities beveled gear-wheels $n$ in mesh with the gear-wheels $q\,p$, compressor-dies H H', eccentrically connected with the shafts I, and reciprocated laterally by the rotation of the shafts I, substantially as described.

6. In a machine for shaping annular metal bodies into coupling-links, the combination, with the frame of the machine, of a horizontal driving-shaft, F, beveled gear-wheels $q\,p$, and a crank, G, on the driving-shaft, a mandrel, E, reciprocated by the crank G, guides D D' for the mandrel, vertical shafts I, having at their upper extremities beveled gear-wheels $n$ in mesh with the gear-wheels $q\,p$, compressor-dies H H', grooved longitudinally on their inner surfaces, and cranks $o\,o'$, connecting the shafts I and compressor-dies, substantially as described.

7. A machine for shaping annular metal bodies into coupling-links, comprising, in combination, a base, B, having a strengthening-rib, L, forming a seat for the ring, pillars A, supporting a table, C, and provided with extensions $r$, a horizontal driving-shaft, F, supported by the table C, beveled gear-wheels $q\,p$, and a crank, G, on the driving-shaft, a mandrel, E, reciprocated by the crank G, guides D D' for the mandrel, vertical shafts I, supported in the extensions $r$, and having at their upper extremities beveled gear-wheels $n$ in mesh with the gear-wheels $q\,p$, grooved compressor-dies H H' on the base B, and cranks $o\,o'$, adjustably connecting the compressor-dies with the shafts I, whereby the said dies are reciprocated laterally by the rotary movement of the shafts I, the whole being constructed and arranged to operate substantially as described.

JAMES J. ANDERSON.

In presence of—
HENRY HUDSON,
JULIUS W. DYRENFORTH.